Nov. 25, 1958   J. E. COLLINS   2,861,594
SOLENOID VALVE
Filed Oct. 15, 1952
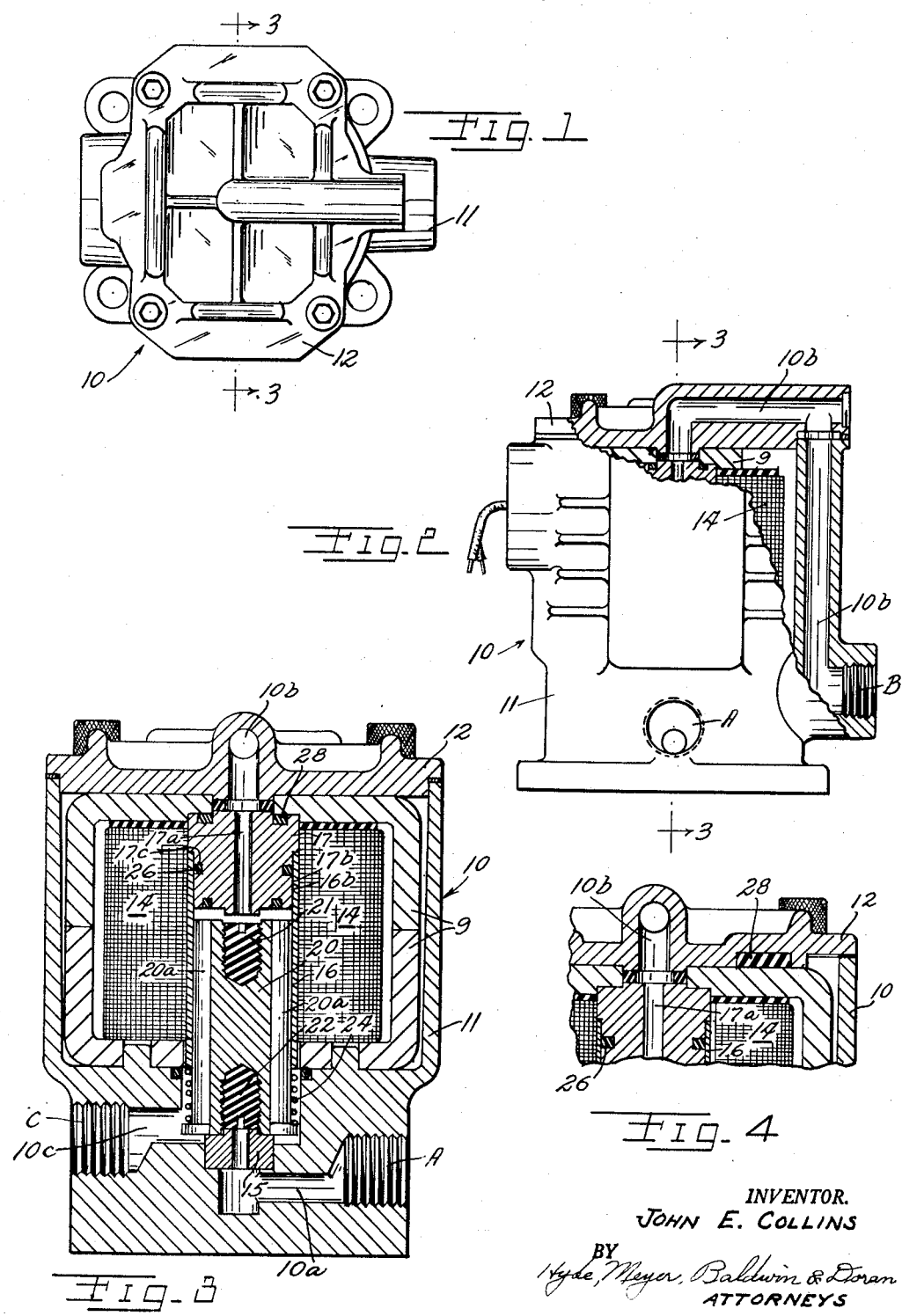
INVENTOR.
JOHN E. COLLINS
BY
Hyde, Meyer, Baldwin & Doran
ATTORNEYS _United States Patent Office_ 2,861,594
Patented Nov. 25, 1958

2,861,594

SOLENOID VALVE

John E. Collins, Akron, Ohio

Application October 15, 1952, Serial No. 314,905

3 Claims. (Cl. 137—625.5)

This invention relates to improvements in solenoid operated devices and more particularly to improvements in a solenoid operated valve.

One of the objects of the present invention is to provide within a solenoid coil a sleeve member encasing the reciprocating solenoid plunger with the sleeve member formed separate from an end stop member for arresting movement of the plunger upon energization of the solenoid coil so that the solenoid will operate quietly with a minimum strain on the component parts to give them long life.

Another object of the present invention is to provide a solenoid operated fluid valve having the solenoid structure mentioned in the preceding paragraph and having a fluid in the sleeve member with seal means between the sleeve member and end stop member to prevent leakage therebetween while permitting relative motion therebetween.

Another object of the present invention is to provide a solenoid operated fluid valve with a stop member for arresting movement of the solenoid plunger upon energization of the solenoid and a resilient back-up member behind the stop member for absorbing the kinetic energy of the plunger during stopping.

Another object of the present invention is to provide a solenoid operated fluid valve characterized by its structural simplicity, its long operating life with minimum maintenance, its economy of manufacture, and the ease of assembly of its parts.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 1 is a top plan view of a solenoid operated three way fluid valve;

Fig. 2 is a side elevational view of the solenoid operated fluid valve in Fig. 1 with a portion thereof in vertical section;

Fig. 3 is a vertical sectional view of the valve taken along the line 3—3 in Fig. 1; while Fig. 4 is a sectional view of the upper right hand portion of Fig. 3 but with a modified form of resilient back-up member.

While my invention might be adapted for use with various types of solenoid operated devices, I have chosen to show the same in connection with a solenoid operated plunger valve.

The solenoid operated plunger valve in the present disclosure takes the form of a three-way fluid valve illustrated in the drawings having three ports, but it should be understood that the valve may be a two way, four way or any other type plunger operated valve. The present three way valve has a housing 10 for the valve and solenoid coil structure. This housing includes a base 11 with a cap 12 removably secured thereto by a plurality of screws for facilitating assembly of the solenoid operated valve. An annular solenoid coil 14 is supported and mounted within this housing 10 by magnetic bars or annular members 9 forming wall-like structure therebetween that also serves as a path of travel for the magnetic flux of the solenoid coil 14. This solenoid coil has a central bore for receiving the valve operating plunger, as will be brought out more in detail hereinafter.

The valve body has a hollow interior which houses the various operating parts. In communication with said hollow interior are the passageways 10a, 10b and 10c having at their outer ends the ports A, B and C. At their respective inner ends the passageways 10a and 10b are controlled by the valve heads 21 and 22 on opposed ends of the plunger 20. The structure and operation of these valve heads and their respective seats will be discussed in greater detail below. The passageway 10c is in unimpeded communication with the interior.

These three flow passageways are in fluid communication with each other through the central bore of the solenoid coil. A sleeve member 16 of cylindrical or other form is located in the central bore of the annular solenoid coil and is fixed with respect to the coil and housing while a plug member 17 is telescoped into the upper end of this sleeve member with an approximately vertical bore 17a therethrough forming a port at its lower end to provide a continuous flow passage from passageway 10a or 10c to passageway 10b.

The unit is provided with a plunger 20 made of metallic or other paramagnetic material to be attracted by the electric solenoid coil 14 when energized so that it is readily drawn upwardly through the central bore of the solenoid coil at that time. The plunger 20 has valve closure means formed on its opposite ends. This takes the form of valve heads on the upper and lower faces shown as 21 on the upper or inner end in Fig. 3 and as 22 on the lower or outer end. A spring 24 surrounds the plunger 20 and urges against the lower end of the sleeve member 16 and a head formed on the bottom of the plunger 20 to normally keep the plunger 20 in the position shown in Fig. 3.

However, the plunger 20 is arranged for axial movement through the bore of the sleeve member 16 so that energization of the solenoid coil 14 pulls plunger 20 to a raised position with the valve head 21 engaging the valve seat formed on the lower surface of the plug member 17 while this plug member serves as an end stop member. Hence, it can readily be seen that when the solenoid coil 14 is energized, the plunger 20 is raised so that the valve head 21 seals off the port formed by the lower end of flow passageway bore 17a in this first or operative position, determined by this end stop member 17, while the fluid can continuously flow through the first and third passageways by following the route through the passageway 10a, the bore in the valve seat 15, and passageway 10c.

If the solenoid coil 14 is de-energized, the force of spring 24 will pull the plunger downwardly to the second position, shown in Fig. 3, with the valve head 22 sealingly engaging the valve seat 15 to seal the port thereon to prevent flow from or into the first flow passageway 10a. However, flow can now take place between passageway 10b and 10c through the bore 17a in the plug member 17 and through the sleeve member 16 since axially extending flow passageway portions or grooves 20a are formed in the surface of the plunger throughout its entire length. Hence, the third flow passageway includes not only passageway 10c but also passageway portions 20a so that this flow passageway is in fluid communication with either the second flow passageway comprising port on the lower end of bore 17a and passageway 10b or the first flow passageway comprising the port in the top of valve seat 15 and the passageway 10a.

In the normal or idle position the arrangement is as shown in Fig. 3. Pressure fluid entering port A is stopped by the seated valve head 22. Port C is in communication with port B because valve head 21 is open. When the solenoid coil 14 is energized and plunger 20 is used, port C, which is in communication, for example, with a power cylinder, receives pressure from port A through passageways 10a, 10c, and open valve head 22. Exhaust passage 10b is closed by seated valve head 21. When the solenoid coil 14 is de-energized, the parts return to the positions of Fig. 3, wherein the power cylinder is open to exhaust through port C, passageway 10c, slots 20a, passageways 17a and 10b, and port B.

When the sleeve member 16 and the end stop or plug member 17 are formed as a single integral part with this part fixed in the housing and in the coil bore instead of the two separate parts in the drawing, the sleeve often develops cracks under the repeated blows of the plunger 20 as it moves upwardly from the second to the first position with the fixed, one piece sleeve and plug absorbing the shock of the blow in stopping the plunger. The integral sleeve and plug will therefore have a short wear life and any fluid passing through the sleeve could easily damage the solenoid coil as the fluid escapes through the crack. Also, it may be impossible to maintain the desired pressure or vacuum condition in the fluid system after the crack develops.

A substantially longer life can be obtained from the parts if they are made separately as a sleeve member 16 and plug or end stop member 17, as shown in the present disclosure. The separate sleeve and end stop members respectively have telescopically engaging surfaces 16b and 17b for permitting relative movement of a limited degree between the members, if necessary, when stopping the upward movement of the plunger 20. The end stop member 17 also determines the aforementioned first plunger stopping position by engagement of the inner or upper end of the plunger 20 with the lower end of the end stop member 17 in Fig. 3. The parts have a relatively long life since they are subjected to only a satisfactory working stress when arresting the movement of or stopping plunger 20. The shock of stopping plunger is not transmitted to the fixed sleeve member 16, but is absorbed by the relatively movable end stop member 17.

It should be noted that spring 24 also helps in stopping the plunger to reduce the shock. As the plunger 20 moves upwardly in Fig. 3 upon energization of coil 14, spring 24 is compressed to resist the upward movement. Thus, spring 24 has a dual function since it also moves plunger 20 downwardly against valve seat 15 upon de-energization of coil 14.

Even though relative movement may exist between the sleeve member 16 and the end stop member 17, fluid cannot leak into or out of the flow passageway in the sleeve member 16. A flexible O-ring seal 26 is carried in an annular groove 17c in the end stop member 17 for sealingly engaging the telescoping bore portion 16b of the sleeve member to prevent fluid leakage. Of course, it should be readily understood that the seal 26 could be carried by an annular groove in either the sleeve member 16 or the end stop member 17, whichever is desired. This O-ring seal also tends to insulate the sleeve member 16 from the shock in stopping the upward movement of the plunger 20 so that it also helps in increasing the wear life of the sleeve member 16.

A resilient back-up member is operatively connected between housing 10 and the upper surface of plug or end stop member 17 for snubbing during stopping the upward travel of plunger 20 as it engages the lower face of the plug member 17. The specific back-up member in the Fig. 3 construction takes the form of an annular rubber washer 28 lying between and engaging the wall-like structure of the magnetic members 9 and the end stop member 17. This back-up member with its snubbing action reduces the noise caused by the impact between the plunger member 20 and the end stop member 17 so that the valve will operate quietly. It also tends to absorb the stress on the component parts during the stopping action to again extend the life of the parts. However, it should be clearly understood that the resilient back-up member may be omitted and the remaining construction will still assure a much longer life to the separate sleeve member and end stop member than if the separate sleeve member and end stop member were formed as an integral unit.

Fig. 4 discloses a modified form of resilient back-up member that has the same function and mode of operation as the previously described back-up member 28. However, this back-up member in Fig. 4 takes the form of two parallel rubber bars 28, equally spaced from and on opposite sides of bore 17a but lying between and engaging the housing 10 and the wall-like structure of the magnetic members 9.

It should be noted that this construction does not interfere with the flow path of the magnetic flux through the magnetic members 9 around the solenoid coil 14. Therefore, the coil 14 will not excessively heat up during operation.

Although this solenoid structure with a separate sleeve member 16 and end stop member 17 is especially advantageous for use with the three way fluid valve disclosed in the present application, it should be readily understood that this structure can be used to provide longer life in other types of solenoid operated devices with any of these devices adapted for containing fluid, flowing fluid, or fluid under pressure, whether the fluid takes the form of air, gas, liquids, or other fluids at normal air pressure, high pressure or negative pressure (vacuum). This solenoid structure may also be used to advantage in other type solenoid devices not used as controls in fluid flow paths.

Various changes in details and arrangement of parts can be made by one skilled in the art without departing from the spirit of this invention or the scope of the appended claims.

What I claim is:

1. A fluid control valve comprising a valve housing having a flow passage therethrough, a sleeve fixed in said housing and having a first end thereof communicating with said flow passage and a second end directed away from said flow passage, an electro-magnetic coil encircling said sleeve in said housing, a member having a portion fitting within said second end of said sleeve for restricted telescopic sliding sealing engagement with said second end of the sleeve to form a yieldable stop in said sleeve, a plunger slidable in said sleeve, a valve seat in said flow passage engageable by one end of said plunger, a spring biasing said plunger toward a position of engagement with said valve seat, said plunger being slidable in said sleeve against said biasing means to engage said stop in response to energization of said coil, and means associated with said member to arrest displacement of said member relative to said sleeve resulting from the impact of said plunger against said stop, said member and the latter said means including opposing surfaces engageable to arrest displacement of said member, one of the engageable surfaces including a recess and a resilient member seated therein for cushioning the engagement of said surfaces.

2. A fluid control valve comprising a valve housing having two fluid flow passages at spaced apart positions in said housing, a sleeve fixed in said housing and having a first end communicating with one said flow passage and said sleeve having a second end directed toward the other of said flow passages, an electro-magnetic coil encircling said sleeve in said housing, a member having a portion fitting within said second end of said sleeve for restricted telescopic sliding sealing engagement with said second end of the sleeve to form a yieldable stop inside said sleeve, said member including the stop portion thereon and having an opening therethrough communicating the interior of the sleeve with said flow passage near said second end of the sleeve, a plunger slidable in said sleeve, a longitudinal passage between the plunger and said sleeve to provide communication between said flow passages of the housing through said sleeve, said plunger having means biasing it away from said stop portion and being slidable against said biasing means to engage said stop portion and close said opening therein in response to energization of said coil, and means associated with said member to engage and arrest displacement of said member relative to the second end of said sleeve resulting from the impact of said plunger against said stop portion, and a resilient member for cushioning the engagement of said displacable member and said arresting means.

3. Valve mechanism in accordance with claim 2 wherein said flow passage communicating with said first end of said sleeve includes a valve seat, and wherein said plunger is urged by said biasing means toward a position to close said valve seat when said coil is de-energized.

References Cited in the file of this patent

UNITED STATES PATENTS

| | | |
|---|---|---|
| 1,226,748 | Burnham | May 22, 1917 |
| 2,096,763 | Ray | Oct. 26, 1937 |
| 2,279,243 | Parsons | Apr. 7, 1942 |
| 2,289,563 | Wood | July 14, 1942 |
| 2,547,390 | Harris | Apr. 3, 1951 |
| 2,587,357 | McPherson | Feb. 26, 1952 |
| 2,614,584 | Goepfrich | Oct. 21, 1952 |
| 2,616,452 | Clay | Nov. 4, 1952 |

FOREIGN PATENTS

| | | |
|---|---|---|
| 567,281 | France | Feb. 27, 1924 |